United States Patent
Michalscheck et al.

(10) Patent No.: US 11,740,614 B2
(45) Date of Patent: *Aug. 29, 2023

(54) SYSTEMS AND METHODS FOR A MULTI-PURPOSE SENSING DEVICE FOR INDUSTRIAL AUTOMATION EQUIPMENT

(71) Applicant: ROCKWELL AUTOMATION TECHNOLOGIES, INC., Mayfield Heights, OH (US)

(72) Inventors: Jimi R. Michalscheck, Racine, WI (US); Kelly A. Michalscheck, Racine, WI (US); Jessica L. Korpela, Milwaukee, WI (US); Kyle K. Reissner, Hudson, OH (US); David A. Vasko, Hartland, WI (US); Matthew W. Fordenwalt, Hudson, OH (US); John J. Jauquet, Milwaukee, WI (US); Matthew R. Ericsson, Lyndhurst, OH (US); Andrew Wilber, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/195,108

(22) Filed: Mar. 8, 2021

(65) Prior Publication Data

US 2021/0232124 A1 Jul. 29, 2021

Related U.S. Application Data

(60) Continuation of application No. 16/522,473, filed on Jul. 25, 2019, now Pat. No. 10,942,506, which is a (Continued)

(51) Int. Cl.
*G05B 19/418* (2006.01)
*G07C 3/00* (2006.01)
(Continued)

(52) U.S. Cl.
CPC .......... *G05B 19/4185* (2013.01); *F16K 31/00* (2013.01); *F16K 35/00* (2013.01); (Continued)

(58) Field of Classification Search
CPC ... G05B 19/4185; G05B 19/042; G06F 17/18; G07C 3/00
See application file for complete search history.

(56) References Cited

U.S. PATENT DOCUMENTS 7,729,511 B2 * 6/2010 Wohler ................. B25J 9/1697
340/508
10,394,227 B2 * 8/2019 Michalscheck .... G05B 19/4183
(Continued)

*Primary Examiner* — Bryan Bui
(74) *Attorney, Agent, or Firm* — Fletcher Yoder, P.C.

(57) ABSTRACT

In one embodiment, a multi-purpose sensor may couple to a machine operating in an industrial environment and include numerous sensors disposed within the multi-purpose sensor to acquire sets of data associated with the machine or an environment surrounding the machine. A first portion of the sets of data may include historical sensor measurements over time for each of the sensors, and a second portion of the sets of data may include sensor measurements subsequent to when the first portion is acquired for each of the sensors. A processor of the multi-purpose sensor may determine a baseline collective signature based on the first portion, determine a subsequent collective signature based on the second portion, determine whether the collective signatures vary, and generate signals when a variance exists. The signals may cause a computing device, a cloud-based computing system, and/or a control/monitoring device to perform various actions.

20 Claims, 8 Drawing Sheets

Related U.S. Application Data division of application No. 14/788,425, filed on Jun. 30, 2015, now Pat. No. 10,394,227.

(60) Provisional application No. 62/139,182, filed on Mar. 27, 2015.

(51) Int. Cl.

| | |
|---|---|
| *G05B 19/042* | (2006.01) |
| *G06F 17/18* | (2006.01) |
| *G07C 9/28* | (2020.01) |
| *G05B 19/406* | (2006.01) |
| *G07C 9/00* | (2020.01) |
| *F16K 31/00* | (2006.01) |
| *F16K 35/00* | (2006.01) |
| *F16K 37/00* | (2006.01) |
| *H02J 4/00* | (2006.01) |

(52) U.S. Cl.
CPC ........ *F16K 37/0025* (2013.01); *G05B 19/042* (2013.01); *G05B 19/406* (2013.01); *G05B 19/4183* (2013.01); *G05B 19/4184* (2013.01); *G05B 19/41875* (2013.01); *G06F 17/18* (2013.01); *G07C 3/00* (2013.01); *G07C 9/00309* (2013.01); *G07C 9/00896* (2013.01); *G07C 9/28* (2020.01); *H02J 4/00* (2013.01); *G05B 2219/21147* (2013.01); *G05B 2219/31229* (2013.01); *G05B 2219/32368* (2013.01); *G05B 2219/39251* (2013.01); *G05B 2219/50193* (2013.01); *Y02P 80/10* (2015.11); *Y02P 90/02* (2015.11); *Y02P 90/80* (2015.11)

(56) References Cited

U.S. PATENT DOCUMENTS

| | | | |
|---|---|---|---|
| 10,942,506 B2 * | 3/2021 | Michalscheck | .... G05B 19/4184 |
| 2008/0079598 A1 | 4/2008 | Bibelhausen et al. | |
| 2009/0024359 A1 | 1/2009 | Bibelhausen et al. | |
| 2012/0330452 A1 | 12/2012 | Guenther et al. | |
| 2015/0330772 A1 | 11/2015 | Charusabha et al. | |
| 2016/0189366 A1 | 6/2016 | Chamberlin et al. | |

* cited by examiner

SYSTEMS AND METHODS FOR A MULTI-PURPOSE SENSING DEVICE FOR INDUSTRIAL AUTOMATION EQUIPMENT

CROSS REFERENCE TO RELATED APPLICATIONS

This application is a continuation of U.S. patent application Ser. No. 16/522,473, entitled "Systems And Methods For A Multi-Purpose Sensing Device For Industrial Automation Equipment", filed Jul. 25, 2019, which is a divisional of and claims priority to U.S. patent application Ser. No. 14/788,425, entitled "Systems and Methods for a Multi-Purpose Sensing Device for Industrial Automation Equipment", filed on Jun. 30, 2015, which claims priority to U.S. Provisional Patent Application No. 62/139,182, entitled "Systems and Methods for Exchanging Information Between Devices in an Industrial Automation Environment," filed Mar. 27, 2015, which are hereby incorporated by reference for all purposes.

BACKGROUND

The present disclosure generally relates to an industrial automation system. More particularly, the present disclosure relates to systems and methods for a multi-purpose sensing device for industrial automation equipment, such as a machine, that is associated with the industrial automation system.

BRIEF DESCRIPTION

In one embodiment, a multi-purpose sensor may couple to a machine operating in an industrial environment. The multi-purpose sensor may include a number of sensors disposed within the multi-purpose sensor to acquire a number of different types of sets of data associated with the machine or an environment surrounding the machine. A first portion of the number of different types of sets of data may include historical sensor measurements over time for each of the number of sensors, and a second portion of the number of different types of sets of data may include sensor measurements subsequent to when the first portion is acquired for each of the number of sensors. The multi-purpose sensor may also include a processor disposed within the multi-purpose sensor and communicatively coupled to the number of sensors. The processor may determine a baseline collective measurement signature for the number of sensors based on the first portion, determine a subsequent collective measurement signature based on the second portion, determine whether the subsequent collective measurement signature varies from the baseline collective measurement signature, and generate one or more signals when a variance exists between the subsequent collective measurement signature and the baseline collective measurement signature. The one or more signals may cause a computing device, a cloud-based computing system, a control/monitoring device, or some combination thereof in the industrial environment to perform a preventative action, diagnostic, predictive operation, or some combination thereof. The processor may transmit the one or more signals to the computing device, the cloud-based computing system, the control/monitoring device, or some combination thereof.

In one embodiment, a system may include a machine configured to operate in an industrial environment and a multi-purpose sensor that may couple to the machine. The multi-purpose sensor may include a number of sensors disposed within the multi-purpose sensor to acquire a number of different types of sets of data associated with the machine or an environment surrounding the machine. A first portion of the number of different types of sets of data may include historical sensor measurements over time for each of the number of sensors, and a second portion of the number of different types of sets of data may include sensor measurements subsequent to when the first portion is acquired for each of the number of sensors. The multi-purpose sensor may also include a processor disposed within the multi-purpose sensor and communicatively coupled to the number of sensors. The processor may determine a baseline collective measurement signature for the number of sensors based on the first portion, determine a subsequent collective measurement signature based on the second portion, determine whether the subsequent collective measurement signature varies from the baseline collective measurement signature, and generate one or more signals when a variance exists between the subsequent collective measurement signature and the baseline collective measurement signature. The one or more signals may cause a computing device, a cloud-based computing system, a control/monitoring device, or some combination thereof in the industrial environment to perform a preventative action, diagnostic, predictive operation, or some combination thereof. The processor may transmit the one or more signals to the computing device, the cloud-based computing system, the control/monitoring device, or some combination thereof.

In one embodiment, a method may include receiving, by a processor disposed within a multi-purpose sensor that may couple to a machine operating in an industrial environment, a number of different types of sets of data from a number of sensors disposed within the multi-purpose sensor. The number of different types of sets of data are associated with the machine or an environment surrounding the machine, a first portion of the number of different types of sets of data may include historical sensor measurements over time for each of the plurality of sensors, and a second portion of the number of different types of sets of data comprises sensor measurements subsequent to when the first portion is acquired for each of the number of sensors. The method may also include determining, via the processor, a baseline collective measurement signature for the number of sensors based on the first portion, determining a subsequent collective measurement signature based on the second portion, determining whether the subsequent collective measurement signature varies from the baseline collective measurement signature, generating one or more signals when a variance exists between the subsequent collective measurement signature and the baseline collective measurement signature. The one or more signals may cause a computing device, a cloud-based computing system, a control/monitoring device, or some combination thereof in the industrial environment to perform a preventative action, diagnostic, predictive operation, or some combination thereof. The method may also include transmitting the one or more signals to the computing device, the cloud-based computing system, the control/monitoring device, or some combination thereof.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
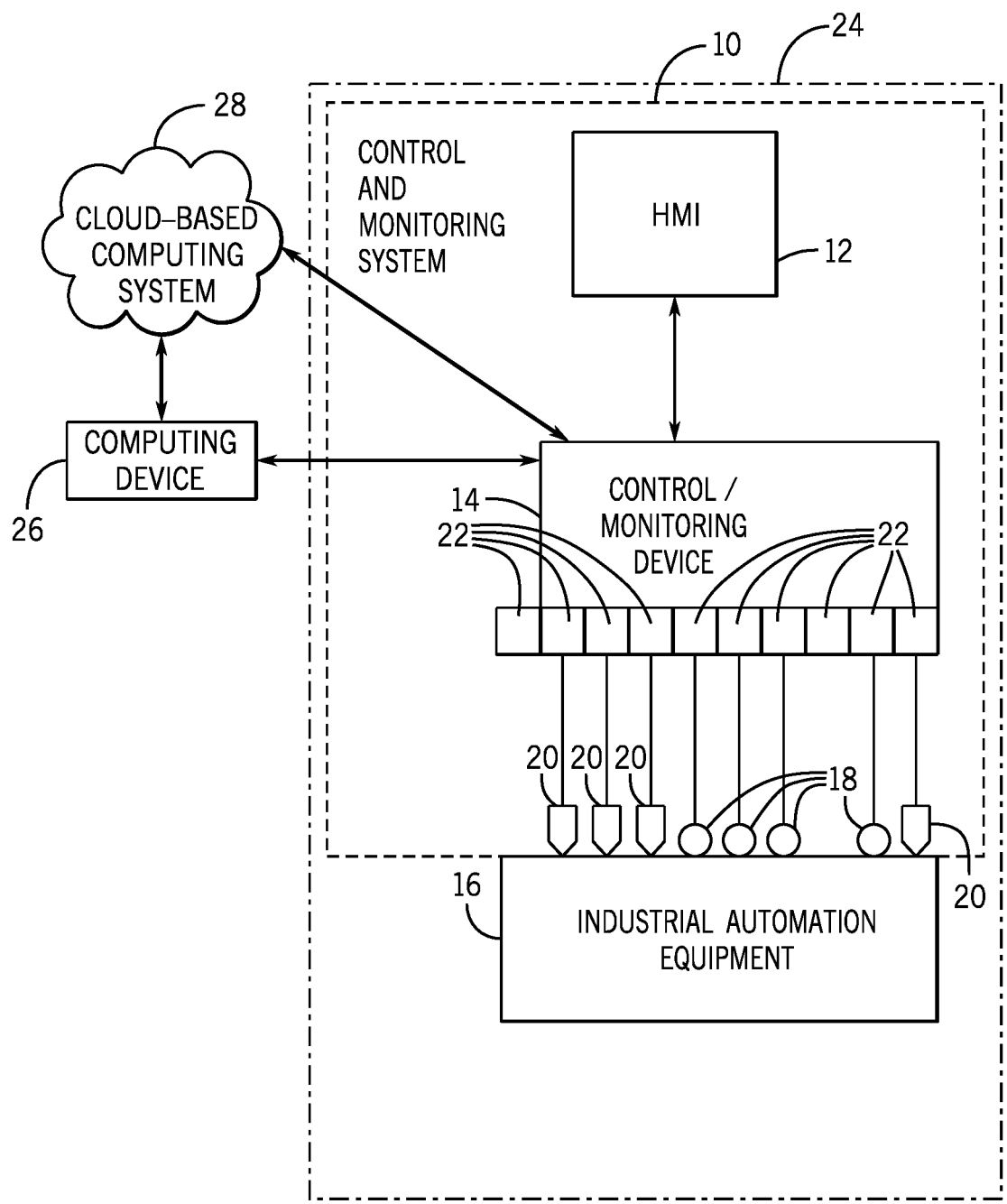
FIG. 1 is a diagrammatical representation of an exemplary control and monitoring system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, the present disclosure discusses numerous concepts regarding how devices in an industrial automation system may exchange information with each other and use this shared information to assist users in the industrial automation environment to manage the operations and maintenance of the devices. In one embodiment, the industrial automation system may include a communication architecture that is structured according to a tri-partite paradigm that facilitates communications between a device, a computing device, and a cloud-based computing system. The information shared between each component within this tri-partite structure may enable various devices within the industrial automation system to operate more efficiently, users to perform tasks related to the conditions or operations of the industrial automation system more efficiently, and generally provide for improved operations of the industrial automation system. In addition, the information shared within the tri-partite structure may include data obtained via a multi-purpose sensing device attached to an industrial component (e.g., a machine) associated with the industrial automation system. The data may be used to determine operational parameters of the industrial component, parameters of the environment around the industrial component, directions to a physical location of the multi-purpose sensing device and/or the industrial component, a location of a technician relative to the industrial component, or the like.

Numerous sensors are often used to monitor one or more properties of an industrial automation device (e.g., a machine) used in an industrial automation system. The types of sensors may include vibration, temperature, motion, sound, pressure, and so forth. Generally, the sensors may be individual devices that serve a single purpose. Also, the sensors are often disposed in various locations on or around the industrial automation device, thereby taking up a certain amount of physical space on or within the device where physical space may be limited. In some instances, the sensors may only communicate with other devices via a wired connection. In this case, wiring complexity may increase in proportion to the number of sensors used on the device. Further, the sensors may be small in size and difficult to locate on the devices when a technician attempts to service and/or replace the sensors and/or the machine the sensors are monitoring.

Accordingly, embodiments of the present disclosure relate to providing a multi-purpose sensing device that may be attached to an industrial automation device. "Multi-purpose," as used herein, may refer to the sensing device serving multiple purposes, including enhanced sensing of properties of the machine and the environment surrounding the machine using a number of sensors in one device. In one embodiment, a multi-purpose sensing device may enable a computing device to determine directions to the multi-purpose sensing device and/or the machine, among other things described below. In some embodiments, the multi-purpose sensing device may include a number of gas sensors (e.g., oxygen), temperature sensors, motion sensors, vibration sensors, sound sensors, and the like consolidated in a single device.

Also, the multi-purpose sensing device may include a processor that may receive data from each of the sensors and may process the data for various types of analysis. For example, the multi-purpose sensing device may continuously monitor certain properties associated with the industrial automation device and the environment surrounding the device over time to determine whether the industrial automation device and/or the environment surrounding the device is suitable for the purposes of the corresponding industrial automation system. That is, when measurements acquired by the multi-purpose sensing device are outside a range of expected measurements, the processor may perform a preventative action, such as send a notification to a technician and/or send a command to the industrial automation device. Additionally, the processor may determine one or more baseline signatures based on the sensor measurements over periods of time and compare the baseline signatures to other signatures determined based on sensor measurements taken later. In this way, the processor may analyze a measurement from one sensor with respect to the measurements from the other sensors at various modes of operation of the machine. When the signatures vary, the processor may perform a preventative action, diagnostics, and/or predictive behavior. As such, the multi-purpose sensing device may include a wireless communication component (e.g., antenna) that enables wirelessly transmitting and receiving data. As a result, the multi-purpose sensing device may reduce wiring complexity by using wireless communication.

In some instances, locating sensors in an industrial automation system may be difficult due to the size and/or arrangement of the devices used in the system. Accordingly, in some embodiments, the multi-purpose sensing device may also include a location beacon or tag that may be used to enable a computing device (e.g., tablet, smartphone) to determine navigational directions to the multi-purpose sensing device and/or the respective industrial automation device associated with the multi-purpose sensing device. Additionally, some embodiments may include the multi-purpose sensing device, the computing device, a cloud-based computing system, or the like using proximity sensing techniques to determine location information related to neighboring devices based on data obtained by the multi-purpose sensing device, the computing device, the cloud-based computing system, and the like.

Further beneficial techniques provided by the multi-purpose sensing device may include performing a preventative action, such as disabling certain steps of procedures (e.g., lockout-tagout) displayed by software on the industrial automation device, based on the location of the technician relative to the industrial automation device. For example, certain operations performed by technicians, machinery, and/or processes in a factory, plant, and the like, may involve performing certain procedures to ensure that the operations are executed properly. When preparing to service an industrial automation device (e.g., drive), a technician may follow a lockout-tagout procedure associated with placing the particular industrial automation device offline before performing the service operations. Here, if the multi-purpose sensing device determines that certain conditions exist with the industrial automation device or the surrounding environment to place the industrial automation device offline, the multi-purpose sensing device may disable certain operational functions of a computing device used by the technician attempting to place the industrial automation device offline.

In some embodiments, a tri-partite paradigm or communication network may enable at least three types of components to exchange information regarding an industrial automation system between each other more efficiently. The components of the communication network may include, in one example, the computing device, the device or machine operating in an industrial automation system, and the cloud-based computing system communicatively coupled to the computing device and the device in the industrial automation system. In one embodiment, this tri-partite paradigm may involve a software application operating on a computing device, such that the software application may monitor, control, access, or view an automation device in the industrial automation system. The computing device may use the data sent from the multi-purpose sensing device to control the operation of the software application used to assist the technician with regard to the maintenance and operation of equipment in an industrial automation system and/or to control the operation of equipment of the industrial automation system. In some embodiments, the software may assist the technician to perform a lockout-tagout procedure, which may detail how to place equipment offline to enable the technician to perform maintenance on the respective equipment.

As discussed herein, lockout-tagout procedures are used throughout various industries and research settings to ensure that machinery and/or processes are placed offline properly and not started prior to the completion of maintenance or servicing. Generally, a lockout-tagout procedure may include physically locking a part of the machinery in one position (e.g., off) to prevent the part from shifting to an alternate position (e.g., on). The procedure may then involve tagging or placing a label on the device to indicate that the machinery is locked out or is being serviced. Typically, the tag may include information such as a statement (e.g., "do not operate—equipment locked out") and the information of the person who affixed the tag to the device.

Using the data from the multi-purpose sensing device, the software application may cause certain steps of the lockout-tagout procedure to be performed via the computing device to be disabled when the data indicates measurements are not within the range of expected measurements. In addition, the software may use the location data to provide navigational directions to certain industrial automation devices associated with particular steps of the lockout-tagout procedure based on data received from the multi-purpose sensing device.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements. Although not depicted in FIG. 1, the control and monitoring system 10 may also include controllers, input/output (I/O) modules, motor control centers, operator interfaces, contactors, starters, drives, relays, network switches (e.g., Ethernet switches, modular-managed, fixed-managed, service-router, industrial, unmanaged, etc.), and the like.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include motors, protection devices, switchgear, compressors, and the like.

In certain embodiments, one or more properties of the industrial automation equipment 16 may be monitored and controlled by certain equipment for regulating control variables. For example, sensors 18 and actuators 20 may monitor various properties of the industrial automation equipment 16 and may be involved to adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP, ControlNet, DeviceNet, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28.

Figure 2:
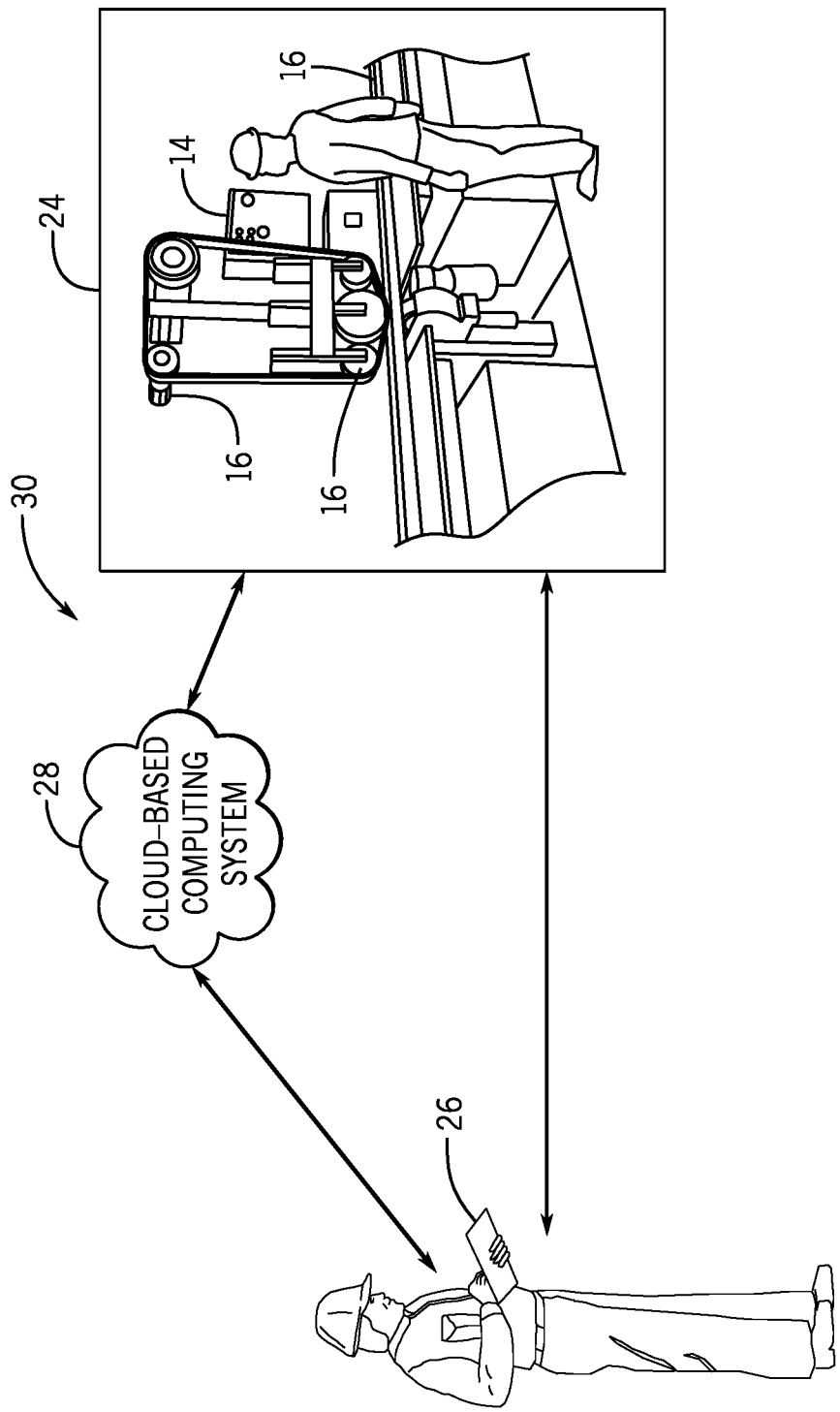
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
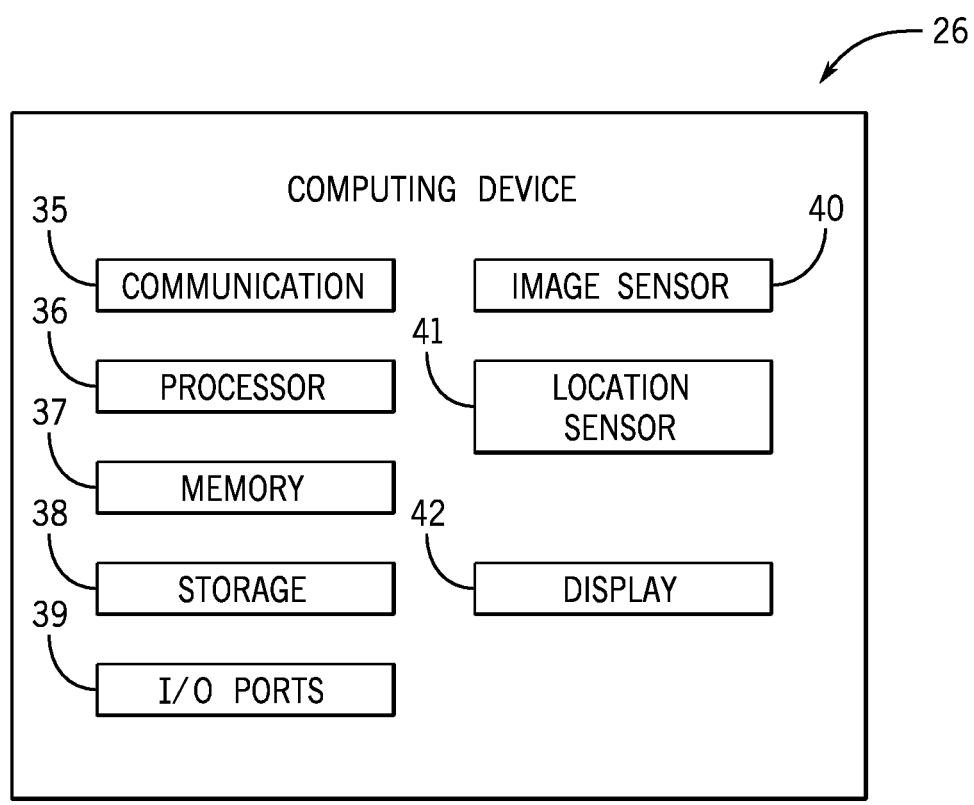
FIG. 3 is a block diagram of example components within a computing device that is part of the communication network of FIG. 2, in accordance with embodiments presented herein.

FIG. 3 is a block diagram of example components within the computing device 26 that is part of the communication network 30 of FIG. 2, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a display 42, additional sensors (e.g., vibration sensors, temperature sensors), and the like. The communication component 35 may be a wireless or wired communication component that may facilitate communication between the industrial automation equipment 16, the cloud-based computing system 28, and other communication capable devices (e.g., apparatuses described below).

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16. As such, the computing device 26 may communicatively couple to industrial automation equipment 16 or to a respective computing device of the industrial automation equipment 16 via a direct connection between the two respective devices or via the cloud-based computing system 28. Additionally, the memory 37 may be used to store the expected ranges for the various sensor measurements, as well as the baseline measurement signatures (e.g., for individual sensor measurements and for collective measurements including more than one sensor measurement) for different periods of time (e.g., during phases or modes of operation of the industrial automation equipment 16), discussed below. Further, the memory 37 may store information regarding various reasons associated with varying measurement signatures at different times of operation to enable the processor 36 to determine what preventative actions to take, to diagnose the cause of the variance, and/or to predict what other industrial automation equipment 16 may have issues if the monitored industrial automation equipment 16 continues to operate in the current state.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs from a user of the computing device 26. As such, the display 42 may serve as a user interface to communicate with the industrial automation equipment 16. The display 42 may be used to display a graphical user interface (GUI) for operating the industrial automation equipment 16, for tracking the maintenance of the industrial automation equipment 16, performing various procedures (e.g., lockout tagout, placing device offline, replacing component, servicing device) for the industrial automation equipment 16, and the like. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial equipment 16. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
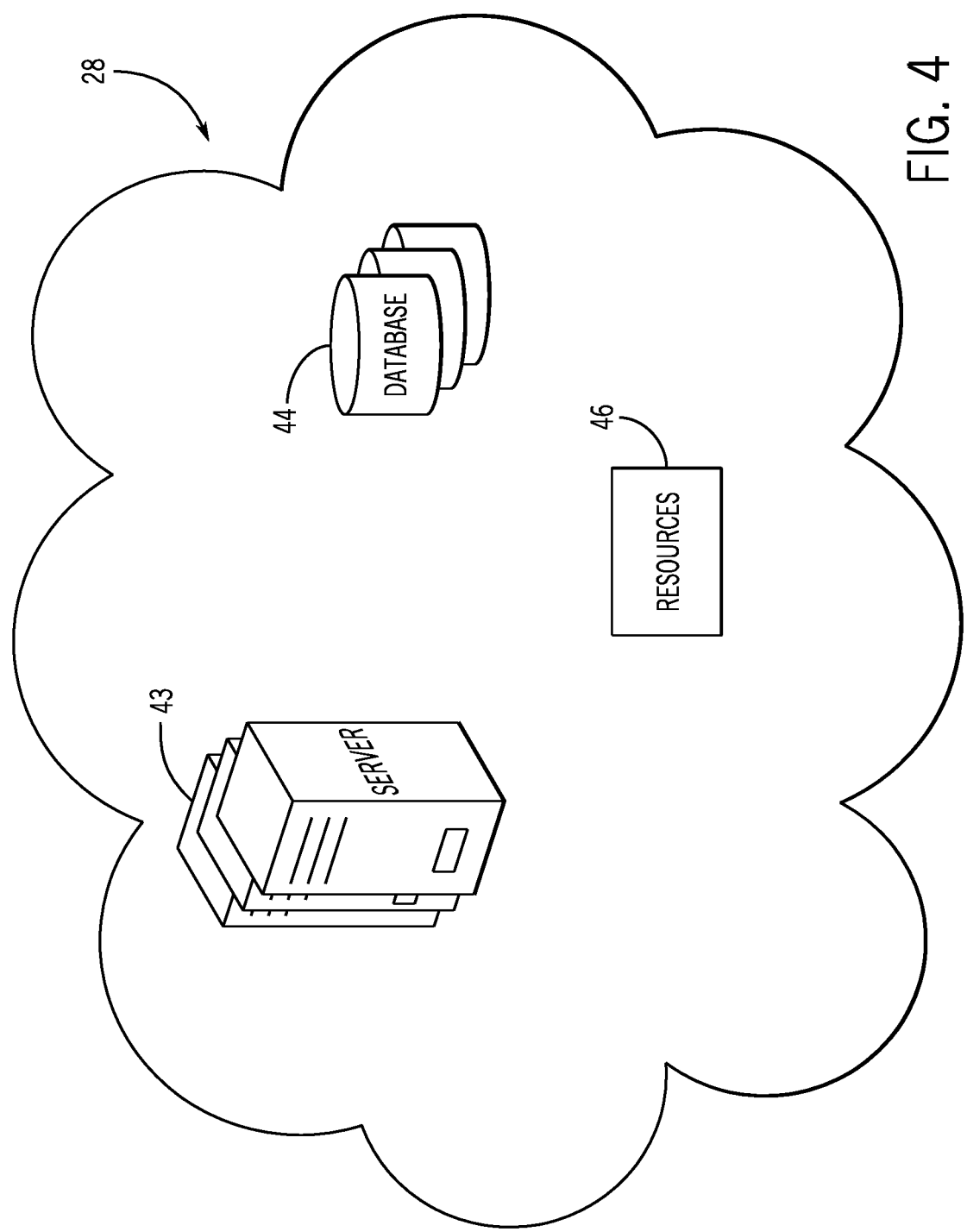
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a resource database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
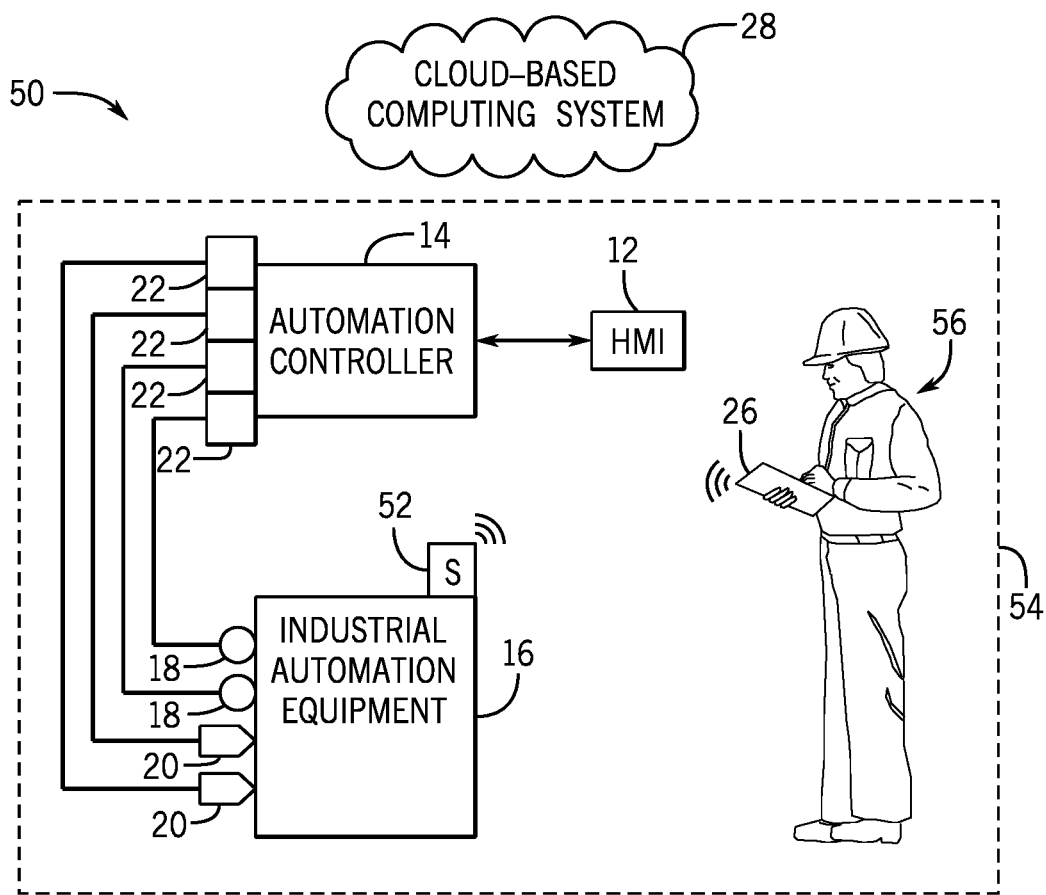
FIG. 5 is a schematic diagram of an industrial automation system including a multi-purpose sensing device, in accordance with embodiments presented herein.
Figure 6:
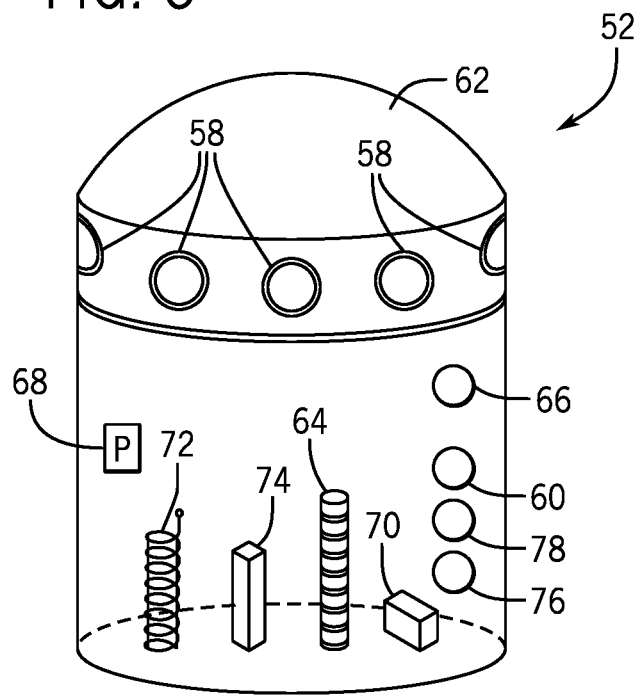
FIG. 6 is a schematic diagram of example components of the multi-purpose sensing device of FIG. 5, in accordance with embodiments presented herein.

FIG. 5 is a schematic diagram of an industrial automation environment 50 including a multi-purpose sensing device 52, in accordance with embodiments presented herein. FIG. 6 is a schematic diagram of example components of the multi-purpose sensing device of FIG. 5, in accordance with embodiments presented herein. FIGS. 5 and 6 are discussed together below for clarity.

As depicted in FIG. 5, the industrial automation environment 50 may include the industrial automation equipment 16 operating in a process area 54 of a facility. As illustrated, a technician 56 may use the computing device 26 to assist in performing a procedure, such as placing the industrial automation equipment 16 (e.g., machinery) offline according to a corresponding lockout-tagout protocol. The industrial automation environment 50 is illustrated as including the HMI 12 and the control/monitoring device or automation controller 14 adapted to interface with other industrial automation equipment, as described above.

In addition to the industrial automation equipment described above with respect to FIG. 1, a multi-purpose sensing device 52 may be coupled to the industrial automation equipment 16 (e.g., machine, pump). The multi-purpose sensing device 52 may be located at any suitable position on the industrial automation equipment 16. In some embodiments, the multi-purpose sensing device 52 may be physically coupled to the industrial automation equipment 16 using any suitable mechanism (e.g., bolts, screws, adhesives, magnets). The multi-purpose sensing device 52 may be configured to obtain data, read data, receive data, process data, transmit data, and the like, as will be further detailed below.

As depicted in FIG. 6, in some embodiments, the multi-purpose sensing device 52 may include one or more gas sensors 58, temperature sensors 60, motion sensors 62, vibration sensors 64, sound sensors 66, processors 68, memories 70, communication components 72, batteries 74, beacon patches 76, location beacons or tags 78, and the like. The communication components 72 may be similar to the communication component 35 discussed above. As such, the communication components 72 may include a wireless or wired communication component that may facilitate communication with the computing device 26, the industrial automation equipment 16 (e.g., machine), the cloud-based computing system 28, and other communication capable devices. In embodiments that use wireless communication, the communication component 72 may include an antenna and enable the processor 68 to send and receive data using any suitable wireless protocol, such as Wi-Fi, Bluetooth®, near field communications, or the like. Further, the antenna 72 may measure the distance between other sensors (e.g., multi-purpose sensing devices 52 or individual sensors) associated with the multi-purpose sensing device 52 to assist in determining directions to the physical locations of the sensors, among other things. Also, the antenna 72 may measure and/or calibrate the technician's location in relation to the industrial automation equipment 16. Additionally, the antenna 72 may receive requests from the computing device 26, the cloud-based computing system 28, and/or the industrial automation equipment 16 for on-demand measurements from one or all of the sensors 58, 60, 62, 64, and 66.

The processor 68 may be similar to the processor 36 described above. That is, the processor 68 of the multi-purpose sensing device 52 may be any type of computer processor or microprocessor capable of executing computer-executable code. The processor 68 may also include multiple processors that may perform the operations described below. The memory 70 may be any suitable articles of manufacture that can serve as media to store processor-executable code, data, or the like. These articles of manufacture may represent computer-readable media (e.g., any suitable form of memory or storage) that may store the processor-executable code used by the processor 68 to perform the presently disclosed techniques.

Generally, the processor 68 may execute computer-readable code that determines certain properties associated with the industrial automation equipment 16 and/or the environment surrounding the industrial automation equipment 16 based on the signals received from the sensors. Further, the processor 68 may perform one or more preventative actions (e.g., send notification to computing device 26, cloud-based system 28, or both, send a command to the industrial automation equipment 16), diagnostics, and/or predictive operations when the measurements are outside a range of expected measurements, when the measurements vary from baseline signatures (e.g., a baseline collective measurement signature and/or a baseline individual measurement signature), the technician 56 is inside the industrial automation equipment 16, a certain operational parameter is detected, and the like. In one embodiment, the processor 68 may perform triangulation techniques to assist the computing device 26 in determining directions to the multi-purpose sensing device 52 and/or the industrial automation equipment 16 to which the device 52 is attached based on at least three known locations of various machines or components in the industrial automation environment 50.

The memory 70 may also be used to store the data, analysis of the data, and the like. Like the memory 37 discussed above, the memory 70 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

In some embodiments, the battery 74 may be rechargeable and may include any suitable electrode materials and/or electrolytes (e.g., nickel cadmium (NiCd), nickel metal hydride (NiMH), lithium ion (Li-ion), lithium ion polymer (Li-ion polymer)) that enable storing additional charges. In other embodiments, the battery 74 may use a single charge and be replaced with a new battery 74 when the lifetime of the charge expires.

The discussion below of the various sensors 58, 60, 62, 64, and 66 focuses on the sensors sending data signals to the processor 68 of the multi-purpose sensing device 52 to perform analysis and one or more preventative actions. As such, the sensors 58, 60, 62, 64, and 66 may be communicatively coupled to the processor 68. However, it should be understood that the data signals from the sensors 58, 60, 62, 64, and 66 may be transmitted via the communication component 72 to the computing device 26, the cloud-based computing system 28, and/or the control/monitoring device 14 to perform the analysis and/or to perform the one or more preventative actions, diagnostics, and/or predictive operations described below.

In some embodiments, the one or more gas sensors 58 may enable measuring oxygen content, carbon dioxide content, moisture content, and the like in the ambient air surrounding the multi-purpose sensing device 52 and/or in the environment inside or around the industrial automation equipment 16. The processor 68 may determine a concentration of pollutants (e.g., parts per million by volume (ppmv)) in the ambient air and/or in gaseous emissions to the ambient air from the industrial automation equipment 16 based on signals received from the gas sensors 58. In addition, the processor 68 may determine if a certain amount of fuel/oxygen mixture is detected in the ambient air and perform a preventative action when detected. Further, the processor 68 may perform the preventative action, diagnosis, and/or predictive operation when the oxygen content, carbon dioxide content, moisture content, and/or concentration of pollutants is outside a range of expected measurements or when signatures including the content measurement vary from baseline signatures during certain modes of operation of the industrial automation equipment 16 (e.g., startup, combustion, idling, shutdown). That is, a baseline collective measurement signature may be determined based on historical measurements from multiple sensors (e.g., sensors 58, 60, 62, 64, and 66) over different periods of time (e.g., during different modes of operation of the industrial automation equipment 16) and an individual measurement signature may be determined based on historical measurements from a single sensor. When subsequent collective measurements signatures and/or individual measurement signatures vary from the respective baselines, the preventative action, diagnostics, and/or predictive operation may be performed.

The preventative action may include sending a command (e.g., power off command) to the industrial automation equipment 16, sending an alert to the computing device 26, sending an alert to external systems (e.g., cloud-based computing system 28), triggering an alarm in the facility, and so forth. The diagnostics may include determining what is causing the variance between signatures by searching the memory 70 to determine if there is an associated reason for the variance at the particular mode or phase of operation of the industrial automation equipment 16. The predictive operation may include determining if the detected signatures indicate a certain part or device of the industrial automation equipment 16 or other equipment in the facility is likely to fail and communicating with or controlling that part or device to attempt to inhibit the failure, or sending an alert to the computing device 26 indicating the prediction.

The temperature sensors 60 may include a thermometer that measures the temperature of the industrial automation equipment 16 on which the multi-purpose sensing device 52 may be attached or coupled therewith, the temperature of the air surrounding the industrial automation equipment 16, and so forth. Based on the measured temperatures, the processor 68 may perform a preventative action, diagnostic, and/or preventative operation as described above, when the temperatures are outside a range of expected temperature measurements and/or when the collective measurement signature and/or individual measurement signature varies from the baseline collective measurement signature and/or baseline individual measurement signature, respectively, during certain modes of operation of the industrial automation equipment 16.

The motion sensors 62 may include any type of sensor designed to detect motion of an object in the presence of the sensor. For example, the motion sensors 62 may include a passive infrared (PIR) sensor that senses heat movement. For example, the motion sensors 62 may measure a person's (e.g., technician 56) skin temperature in contrast to other objects in the surrounding area to determine whether the technician is near the motion sensors 62 (e.g., inside or outside of the industrial automation equipment 16). In some embodiments, one more preventative action, as described above, may be performed when the technician 56 is detected near the motion sensors 62. That is, in some embodiments, detecting movement using the motion sensors 62 may indicate that the technician 56 is in a specific area of the industrial environment (e.g., within the industrial automation equipment 16) and certain options (e.g., various controls of the industrial automation equipment 16, functionalities on software on the computing device 26 that assists the technician 56 in performing a lockout-tagout procedure) may not be available to the technician 56 or may cease to be available relative to determining that the technician 56 is not in the specific area. Additionally, certain functionalities may become available when the technician 56 is determined to be in certain specific areas.

The vibration sensors 64 may include any suitable vibration sensor, such as an accelerometer, knock sensor, and the like. The vibration sensors 64 may acquire data signals that indicate a frequency of vibration of the industrial automation equipment 16 or object attached to the vibration sensors 64. In one embodiment, the data signal acquired by the vibration sensors 64 may be provided to the processor 68. As such, the processor 68 may determine one or more operational parameters of the industrial automation equipment 16. For example, the processor 68 may determine whether the industrial automation equipment 16 is on or off and/or whether the industrial automation equipment 16 is operating normally or abnormally based on the signals. That is, if the signals indicate that the industrial automation equipment 16 is vibrating at a certain frequency, the processor 68 may determine that the industrial automation equipment 16 is operational. In addition, the processor 68 may determine the frequency at which the industrial automation equipment 16 near optimally runs and/or the frequency at which the industrial automation equipment 16 runs inefficiently.

Indeed, the processor 68 may learn or determine a range of expected frequency measurements as the industrial automation equipment 16 operates over time, and, when the measured frequency is outside the determined range, the processor 68 may perform a preventative action, diagnostic, and/or predictive operation, as discussed above. To illustrate, a frequency with an amplitude above the upper limit of the range may indicate that the industrial automation equipment 16 is operating abnormally because of a damaged part or the like. Also, the processor 68 may perform a preventative action, diagnostic, and/or predictive operation, when the collective measurement signature and/or individual measurement signature varies from the baseline collective measurement signature and/or baseline individual measurement signature for the vibration sensors 64, respectively, during certain modes of operation of the industrial automation equipment 16. Additionally, the sound sensors 66 may also assist the processor 68 in determining operational parameters of the industrial automation equipment 16. The sound sensors 66 may include any type of sensor that is capable of detecting sound waves generated in the presence of the sensor. For example, in some embodiments, the sound sensors 66 may include a microphone that measures sounds of the industrial automation equipment 16 or sounds in the environment surrounding the industrial automation equipment 16. Based on the measured sound data signals from the sound sensors 66, the processor 68 may determine when the industrial automation equipment 16 is in a particular operating state (e.g., on, off). In addition, the processor 68 may learn or determine a range of expected audio measurements for particular states of the industrial automation equipment 16 (e.g., normal operation, abnormal operation) as the industrial automation equipment 16 operates over time, and the processor 68 may determine whether the industrial automation equipment 16 is operating normally or not based on whether received audio data is outside of the ranges. Further, a baseline collective measurement signature may be determined based on historical measurements from the sensors 58, 60, 62, 64, and 66 over different periods of time (e.g., modes of operation of the industrial automation equipment 16) and an individual collective measurement signature may be determined based on historical measurements from one sensor, such as the sound sensors 66. When subsequent collective measurement signatures and/or individual measurement signatures vary from the baselines, the preventative action, diagnostics, and/or predictive operation may be performed.

To illustrate, in one example, the multi-purpose sensing device 52 may include any suitable number (e.g., 17) of sensors and may be attached to the industrial automation equipment 16, such as a printing press. The 17 sensors may be networked together and provide measurements to the processor 68 that can adjust the operation of the printing press, a process including the printing press, safety protocols, and so forth depending on how many sensors are used, where people are located in the facility, and what the people are doing. In this way, multi-dimensional measurements (e.g., collective measurement signatures) may be obtained from the 17 sensors disposed within the multi-purpose sensing device 52 that is coupled to the printing press (e.g., single machine) and may be used by the processor 68 to at least enhance the operation of the printing press or any suitable industrial automation equipment 16.

In some embodiments, the beacon patch 76 may provide additional data to the computing device 26 and/or the cloud-based computing system 28 related to a distance between neighboring devices to the multi-purpose sensing device 52 and/or the industrial automation equipment 16 to which the multi-purpose sensing device 52 is attached. For example, the beacon patch may use near field communication technology (e.g., Bluetooth®), which may include low energy proximity sensing technology or the like, to determine the proximity of the devices near the beacon patch 76. In some embodiments, the distances between devices may assist in determining directions from the computing device 26 to the multi-purpose sensing device 52 by enabling determining the location of the devices.

To that end, in some embodiments, the location beacon or tag 78 may be used to enable the computing device 26 and/or the cloud-based computing system 28 to determine directions for the technician 56 to reach the multi-purpose sensor 52 and/or the respective industrial automation equipment 16 associated with the multi-purpose sensing device 52. In some embodiments, the location beacon or tag 78 may emit coordinates to its location, the location of the multi-purpose sensing device 52, and/or the location of the industrial automation equipment 16. In one embodiment, the processor 68 may use triangulation schemes to assist the computing device 26 in determining directions to the multi-purpose sensing device 52 or the industrial automation equipment 16.

Triangulation schemes may include determining the location of the multi-purpose sensing device 52 or the industrial automation equipment 16 by measuring the angles to the multi-purpose sensing device 52 or the industrial automation equipment 16 from known points at the ends of a fixed baseline (e.g., a wall of a facility, a line between two other known points (other industrial automation equipment in the facility)). In some embodiments, emitters may be strategically placed in the facility for the purpose of finding the location of the multi-purpose sensing device 52 or the industrial automation equipment 16 by broadcasting the location of the emitters for devices (e.g., computing device 26) to read. The location of the multi-purpose sensing device 52 or the industrial automation equipment 16 can be fixed as the third point of a triangle based on known locations, such as the locations of the emitters. The processor 68 may then determine a route to the location of the multi-purpose sensing device 52 or the industrial automation equipment 16 based on the location of the computing device 26 being held by the technician 56, the location of the technician 56 in the facility, the location of an entrance to the facility, or the like.

Figure 7:
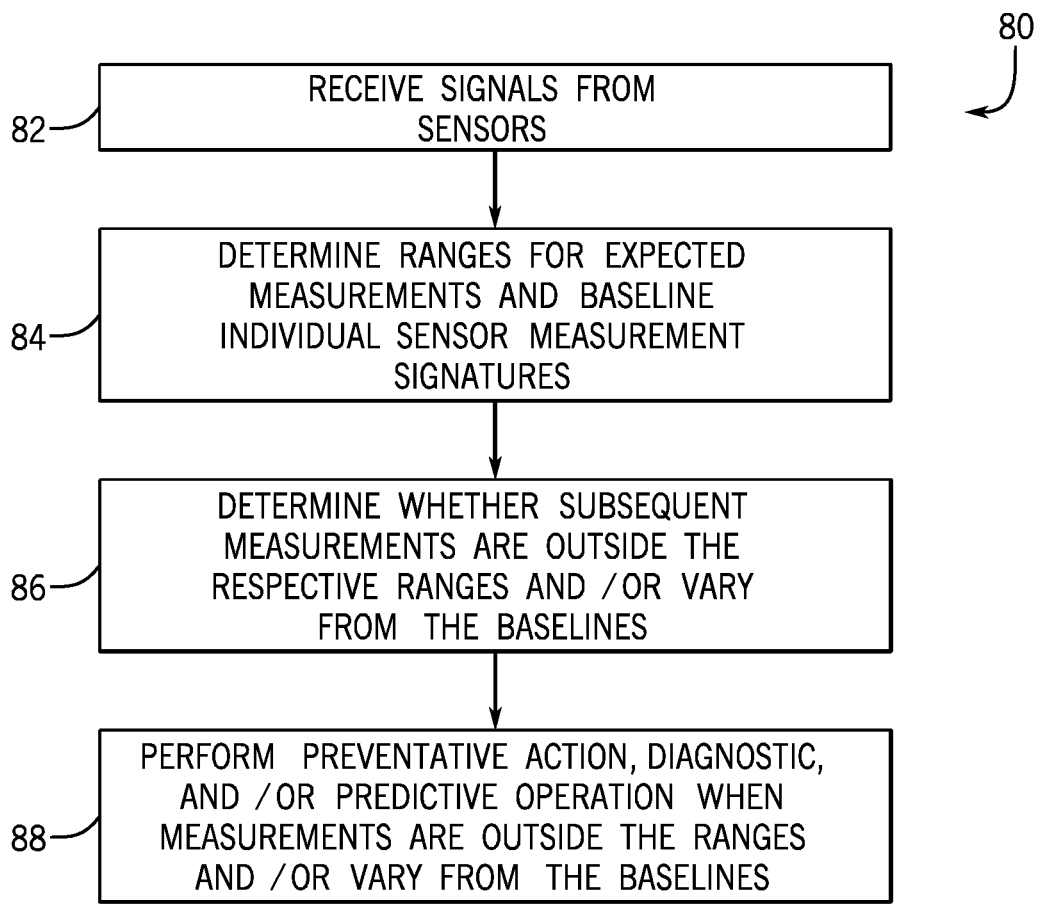
FIG. 7 is a flow diagram of a method for performing a preventative action when measurements are outside a range of expected measurements, in accordance with embodiments presented herein.

FIG. 7 is a flow diagram of a method 80 for performing a preventative action when measurements are outside a range of expected measurements, in accordance with embodiments presented herein. Although the following description of the method 80 is described with reference to the processor 68 of the multi-purpose sensing device 52, it should be noted that the method 80 may be performed by other processors disposed on other devices that may be capable of communicating with the multi-purpose sensing device 52, such as the computing device 26, the cloud-based computing system 28, the industrial automation equipment 16, or other components associated with the industrial application 24. Additionally, although the following method 80 describes a number of operations that may be performed, it should be noted that the method 80 may be performed in a variety of suitable orders and all of the operations may not be performed. It should be appreciated that the method 80 may be wholly executed by the multi-purpose sensing device 52 or the execution may be distributed between the computing device 26 and/or the cloud-based computing system 28.

Referring now to the method 80, the processor 68 may receive data signals (e.g., first sets of data) from the one or more gas sensors 58, temperature sensors 60, motion sensors 62, vibration sensors 64, and/or sound sensors 66 over time as the industrial automation equipment 16 operates (block 82). The data signals may each include a set of data indicating measurements or readings taken by the sensors. The processor 68 may also determine ranges for expected measurements for each of the sets of data associated with the respective sensors 58, 60, 62, 64, and 66 (block 82). For example, the processor 68 may continuously monitor the received data signals from each of the sensors 58, 60, 62, 64, and 66 to learn or determine a range for expected measurements. In some embodiments, the processor 68 may monitor the data signals for a threshold period of time (e.g., 10 minutes, 30 minutes, 60 minutes) to determine the range of expected measurements. In other embodiments, the processor 68 may monitor the data signals until a threshold number of readings (e.g., 5, 10, 15, 20) are received that indicate measurements within a threshold differential to each other to determine the range of expected measurements. In yet other embodiments, the processor 68 may obtain the range of expected measurements for each of the sensors 58, 60, 62, 64, and 66 from the memory 70, the computing device 26, and/or the cloud-based computing system 28, such that the range of expected measurements may be determined based on data related to other similar devices.

Further, the processor 68 may determine baseline individual sensor measurement signatures for various periods of time (block 84). The periods of time may correspond to different modes of operation of the industrial automation equipment 16 (e.g., startup, slow-down, combustion, shut down). For example, the signature for vibration sensor measurements may indicate that during startup the amplitude of the frequency increases and begins to decrease as the industrial automation equipment 16 begins to operate at a steady state. It should be understood that the baseline individual sensor measurement signatures may be obtained for measurements for each sensor 58, 60, 62, 64, and 66 and may be based on historical sensor measurements.

The processor 68 may also determine whether received data signals indicate measurements that are outside the respective range of expected measurements and/or vary from the baseline individual sensor measurement signatures (block 86). In some embodiments, the received data signals (e.g., second sets of data) may be received subsequent to the processor determining the ranges of expected measurements and the baseline individual sensor measurement signatures. For example, if sensor measurements from the vibration sensor indicate a lower aggregate amplitude during startup than the baseline individual sensor measurement signature for the vibration sensor 64, then the processor 68 may determine that the industrial automation equipment 16 is operating abnormally.

Additionally, the processor 68 may perform one or more preventative actions, diagnostics, and/or predictive operations when the measurements are outside a range of expected measurements and/or vary from the baseline individual sensor measurement signatures (block 88). In some instances, the preventative action may vary based on whether the measurements are below or above the range of expected measurements, and may vary by the size of the differential between the measurement and the range. As previously discussed, in some embodiments, the preventative actions may include sending an alert to the computing device 26 and/or cloud-based computing system 28, sending a command (e.g., power off command) to the industrial automation equipment 16, triggering an alarm in the facility, and so forth. In some embodiments, the diagnostics may include determining what is causing the discrepancy between the subsequent measurements and the baseline individual sensor measurement signatures by searching the memory 70 to determine if there is an associated reason for the variance between signatures. The predictive operation may include determining if the detected signatures indicate a certain part or device is likely to fail based on the historical data associated with the detected signatures and communicating with or controlling that part or device to attempt to inhibit the failure. That is, in certain embodiments, certain detected signatures that are different from a respective baseline signature may be associated with a particular condition or result. As such, the predictive operation may be determined based on the condition or result that is associated with the detected signature.

To illustrate, if a measurement by any of the sensors 58, 60, 62, 64, and 66 of the multi-purpose sensing device 52 is outside a range of expected measurements, then the processor 68 may send a command to the industrial automation equipment 16 to go offline and also send an alert to the computing device 26 indicative of the measurement being outside the range. In some embodiments, the computing device 26 may display the alert and/or disable certain functionality presented by software used to assist the technician in performing procedures, such as placing the industrial automation equipment 16 offline using the lockout-tagout protocol, based on the alert received from the multi-purpose sensing device 52. For example, any functionality of the software that enables controlling the industrial automation equipment 16 may be disabled (e.g., graphical elements grayed out, inoperable, or removed) to inhibit the technician 56 from turning the industrial automation equipment 16 on when it is undesirable due to the non-conforming measurements.

Additionally, when comparing collective measurement signatures, a multi-dimensional baseline of sensor measurements over a time period (e.g., baseline collective measurement signature) may be compared to respective subsequent sensor measurements received by the sensors 60, 62, 64, and 66 at a later time over similar time period duration. That is, the baseline collective measurement signature may detail the expected sensor measurements for multiple sensors over some period of time. Subsequent sensor measurements acquired by the multiple sensors may then be organized as a collective measurement signature and compared to the baseline collective measurement to ensure that the industrial automation equipment 16 or some other monitored device is operating properly. In some instances, one sensor measurement signature acquired from a particular sensor may vary from a respective baseline sensor measurement signature expected for the same sensor. However, when evaluating the one sensor measurement signature with respect to a multi-dimensional baseline of sensor measurements (e.g., baseline collective measurement signature), it may be determined that when evaluating the one sensor measurement with respect to each of the other sensor measurements that make up the baseline collective measurement signature, the one sensor measurement may substantially match the respective sensor measurement signature in the baseline collective measurement signature during a particular mode of operation of the equipment 16. As such, the processor 68 may determine that the equipment 16 is operating normally for that particular mode of operation. In other words, if an acquired audio measurement signature varies from an audio measurement signature of the baseline measurement signature for the audio sensor, but the acquired audio sensor measurement signature when viewed with a vibration sensor measurement signature substantially matches the baseline collective measurement signature having both audio and vibration sensor measurements for some mode of operation of the equipment 16, then the processor 68 may determine that the equipment 16 is operating normally for that mode of operation.

Figure 8:
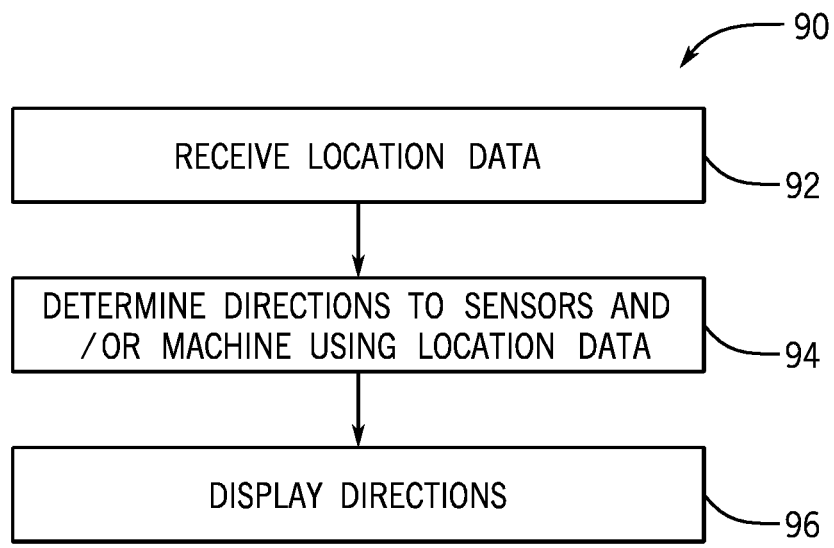
FIG. 8 is a flow diagram of a method for determining directions to a physical location of the multi-purpose sensing device and/or a machine to which the multi-purpose sensing device is attached, in accordance with embodiments presented herein.

FIG. 8 is a flow diagram of a method 90 for determining instructions to a physical location of the multi-purpose sensing device 52 and/or a industrial automation equipment 16 to which the multi-purpose sensing device is attached, in accordance with embodiments presented herein. Although the following description of the method 90 is described with reference to the processor 36 of the computing device 26, it should be noted that the method 90 may be performed by other processors disposed on other devices that may be capable of communicating with the multi-purpose sensing device 52, such as the cloud-based computing system 28, the industrial automation equipment 16, or other components associated with the industrial application 24. Additionally, although the following method 90 describes a number of operations that may be performed, it should be noted that the method 90 may be performed in a variety of suitable orders and all of the operations may not be performed. It should be appreciated that the method 90 may be wholly executed by the computing device 26 or the execution may be distributed between the multi-purpose sensing device 52 and/or the cloud-based computing system 28.

Referring now to the method 90, the processor 36 may receive location data from the multi-purpose sensing device 52 (block 92). In some embodiments, the location data may include coordinates (e.g., global positioning system coordinates) of the location beacon or tag 78 representing a point at which the location beacon or tag 78 is located in the facility. Additionally, the location data may also include information from the beacon patch 76 related to neighboring devices, such as the proximity of the neighboring devices and/or the locations of the neighboring devices. In some embodiments, the computing device 26 may use the location data to determine directions to the multi-purpose sensing device 52 and/or the industrial automation equipment 16 to which the multi-purpose sensing device 52 is attached (block 94). Additionally, the processor 68 of the multi-purpose sensing device 52 may process the signals from the location beacon or tag 68 using triangulation techniques to assist the computing device 26 in determining directions to the multi-purpose sensing device 52. The processor 36 of the computing device 26 may also cause the directions to be displayed on the display 42 so the technician 56 holding the computing device 26 may navigate through the facility to the multi-purpose sensing device 52 and/or the industrial automation equipment 16. This may be particularly useful for efficiently finding particular industrial automation equipment 16 associated with steps of the lockout-tagout protocol provided by the software on the computing device 26.

Figure 9:
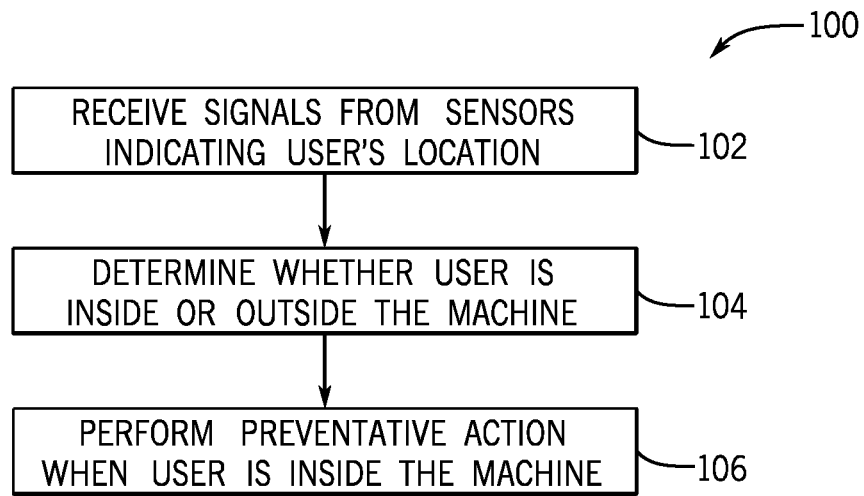
FIG. 9 is a flow diagram of a method for performing a preventative action based on the location of a technician, in accordance with embodiments presented herein.

FIG. 9 is a flow diagram of a method 100 for performing a preventative action based on the location of a technician 56, in accordance with embodiments presented herein. Although the following description of the method 100 is described with reference to the processor 68 of the multi-purpose sensing device 52, it should be noted that the method 80 may be performed by other processors disposed on other devices that may be capable of communicating with the multi-purpose sensing device 52, such as the computing device 26, the cloud-based computing system 28, the industrial automation equipment 16, or other components associated with the industrial application 24. Additionally, although the following method 100 describes a number of operations that may be performed, it should be noted that the method 100 may be performed in a variety of suitable orders and all of the operations may not be performed. It should be appreciated that the method 100 may be wholly executed by the multi-purpose sensing device 52 or the execution may be distributed between the computing device 26 and/or the cloud-based computing system 28.

Referring now to the method 100, the processor 68 may receive data signals from the sensors (e.g., motion sensors 62) indicating the technician's location (block 102). Using the data signals, the processor 68 may determine whether the technician 56 is inside or outside of some industrial automation equipment 16 (block 104). The processor 68 may perform one or more preventative actions when the technician 56 is detected as being within the industrial automation equipment 16, a threshold proximity to the industrial automation equipment 16, or the like (block 106). That is, in some embodiments, detecting movement using the motion sensors 62 may indicate that the technician 56 is in a specific area of the industrial environment (e.g., within the industrial automation equipment 16) and certain options may not be available to the technician 56 or may cease to be available relative to determining that the technician 56 is outside the specific area. For example, the processor 68 may cause the communication component 72 to send a command to the automation controller 14 to turn off power to the industrial automation equipment 16 and send an alert to the computing device 26, which may be displayed by the computing device 26 and/or cause industrial automation equipment 16 control functionality to be disabled from the software used to assist the technician 56 in placing the industrial automation equipment 16 offline according to the lockout-tagout procedure.

Figure 10:
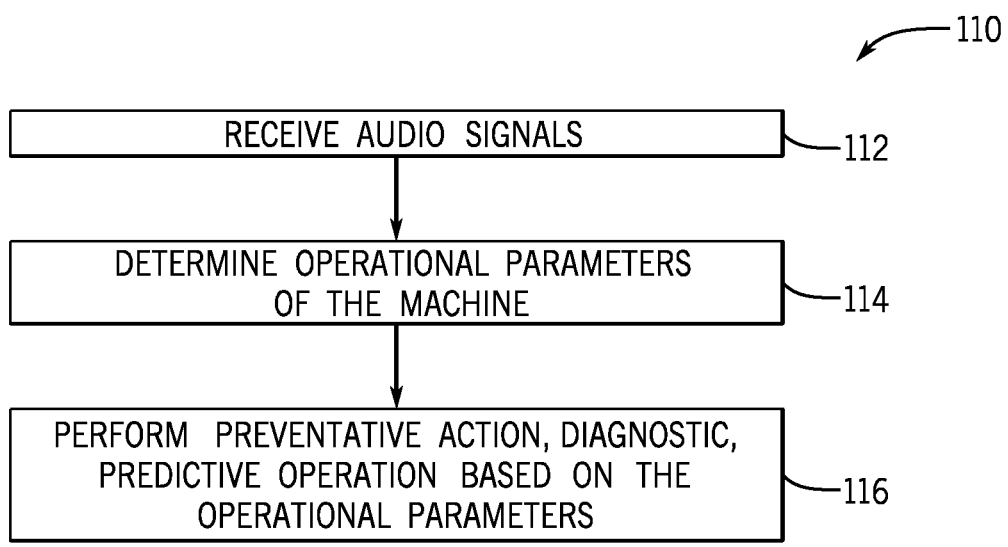
FIG. 10 is a flow diagram of a method for performing a preventative action based on operational parameters, in accordance with embodiments presented herein.

FIG. 10 is a flow diagram of a method 110 for performing a preventative action based on operational parameters, in accordance with embodiments presented herein. Although the following description of the method 110 is described with reference to the processor 68 of the multi-purpose sensing device 52, it should be noted that the method 110 may be performed by other processors disposed on other devices that may be capable of communicating with the multi-purpose sensing device 52, such as the computing device 26, the cloud-based computing system 28, the industrial automation equipment 16, or other components associated with the industrial application 24. Additionally, although the following method 110 describes a number of operations that may be performed, it should be noted that the method 110 may be performed in a variety of suitable orders and all of the operations may not be performed. It should be appreciated that the method 110 may be wholly executed by the multi-purpose sensing device 52 or the execution may be distributed between the computing device 26 and/or the cloud-based computing system 28.

Referring now to the method 110, the processor 68 may receive audio signals from one or more sensors (e.g., sound sensors 66, vibration sensors 64 (knock sensor)) (block 112). Based on the audio signals, the processor 68 may determine various operational parameters of the industrial automation equipment 16 (block 114). The operational parameters may include whether the industrial automation equipment 16 is operating normally or abnormally by comparing the frequencies of the audio signals to a range of expected frequencies, to frequency signatures stored in the memory 70 that indicate normal and abnormal operation, and so forth. Further, the operational parameters may be determined by obtaining a baseline collective measurement signature including the audio measurements over time and/or a baseline individual sensor measurement signature for the audio measurements over time and comparing subsequent audio measurement signatures at the same point in time to the respective baselines. The processor 68 may also perform one or more preventative actions, diagnostics, and/or predictive operations as described above, based on the operational parameters (block 116).

Figure 11:
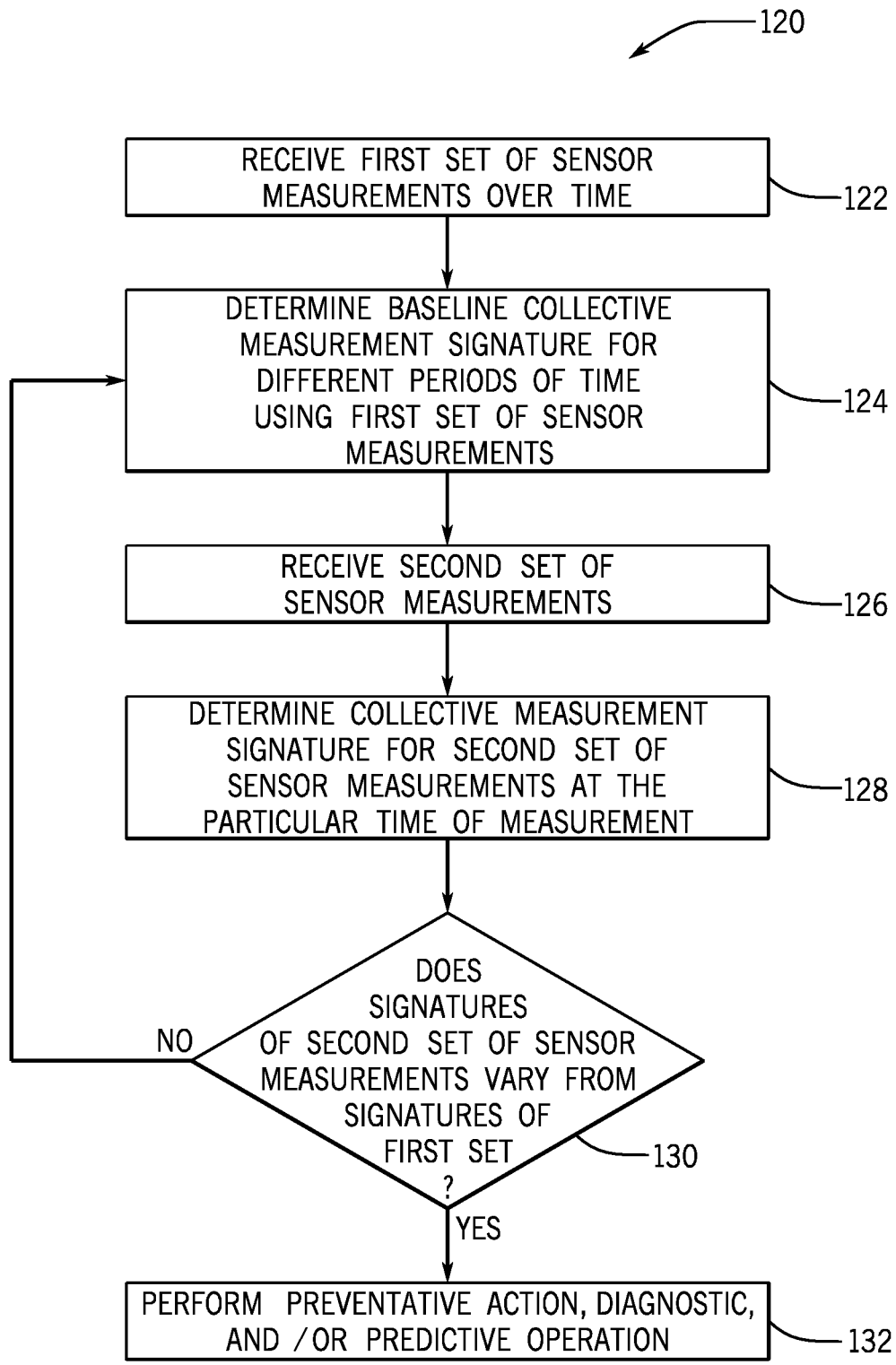
FIG. 11 is a flow diagram of a method for comparing signatures based on sensor measurements for various periods of time, in accordance with embodiments presented herein.

FIG. 11 is a flow diagram of a method 120 for comparing signatures based on sensor measurements for various periods of time, in accordance with embodiments presented herein. Although the following description of the method 120 is described with reference to the processor 68 of the multi-purpose sensing device 52, it should be noted that the method 120 may be performed by other processors disposed on other devices that may be capable of communicating with the multi-purpose sensing device 52, such as the computing device 26, the cloud-based computing system 28, the industrial automation equipment 16, or other components associated with the industrial application 24. Additionally, although the following method 120 describes a number of operations that may be performed, it should be noted that the method 120 may be performed in a variety of suitable orders and all of the operations may not be performed. It should be appreciated that the method 120 may be wholly executed by the multi-purpose sensing device 52 or the execution may be distributed between the computing device 26 and/or the cloud-based computing system 28.

Referring now to the method 120, the processor 68 may receive a first set of sensor measurements over time (block 122). That is, the first set of sensor measurements may include historical data for regarding various properties associated with the industrial automation equipment 16 over time to enable the processor to determine a baseline collective measurement signature for the different periods of time (e.g., operations of the industrial automation equipment 16) using the historical first set of sensor measurements (block 124). The processor 68 may then receive a second set of sensor measurements for a particular time of operation of the industrial automation equipment 16 (block 126). Further, the processor 68 may determine a subsequent collective measurement signature for the second set of sensor measurements at the particular time of measurement (e.g., during a phase or mode of operation of the industrial automation equipment 16) (block 128).

Then, the processor 68 may determine whether the multi-dimensional sensor measurements of the subsequent collective measurement signature of the second set of sensor measurements varies from the multi-dimensional measurements of the baseline collective measurement signature for some particular time of measurement (e.g., phase or mode of operation of the industrial automation equipment 16) (block 130). That is, the baseline collective measurement signature may enable the processor 68 to determine whether industrial automation equipment 16 is operating normally or abnormally by comparing each of the respective sensor measurement signatures in the subsequent collective measurement signature relative to the sensor measurement signatures of the baseline collection of measurements during various periods of times (e.g., modes or phases of operation of the industrial automation equipment 16). For example, if a subsequent audio signature is determined to vary from the audio signature of the baseline measurement signature for the audio sensors, but the combination of the subsequent audio signature and the subsequent vibration signature substantially matches the signatures of the baseline collective measurement signature during start-up of the industrial automation equipment 16, then the processor 68 may determine that the industrial automation equipment 16 is operating normally at startup.

When the signatures of the subsequent collective measurement signature do not vary from the signatures of the baseline collective measurement signature, then the processor 68 may determine the baseline collective measurement signature again using the subsequent collective measurement to maintain a current baseline collective measurement signature (block 124). In contrast, when the measurement signatures of the subsequent collective measurement signature vary from the measurement signatures of the baseline collective measurement signature, the processor 68 may perform a preventative action, diagnostic, and/or predictive operation, as described above (block 132). In some embodiments, the determination that the measurements or signatures vary between collective measurement signatures may be made when more than a threshold number (e.g., 2, 3, 4) of respective individual sensor measurements or signatures of the collective measurement signatures vary, when one of the individual sensor measurement or signature between the collective measurement signatures varies by a threshold amount (e.g., a large variance versus a small variance), or both.

Further, in some embodiments, the processor 68 may learn that some sensor measurement signature variances are indicative of a failure, fault, or abnormal behavior of the industrial automation equipment 16. For example, in some instances, as discussed above, the processor 68 may determine that the industrial automation equipment 16 is operating normally for the particular mode of operation when a sensor measurement signature of the subsequent collective measurement signature varies from the respective sensor measurement signature of the baseline collective measurement signature because other sensor measurement signatures do not substantially vary. Thus, the processor 68 may not take any action. However, if a fault, failure, or abnormal behavior occurs, then the change in the sensor measurement signature may be logged in the memory 70 (e.g., by a user or automatically via the processor 68) and a reason for the fault, failure, or abnormal behavior may be associated with that variance at the particular mode of operation of the industrial automation equipment 16. In this way, the processor 68 may continuously learn measurement signature variances that are indicative of faults, failures, or abnormal behavior to enable better decision making regarding which preventative action to take, better diagnostics, and/or better predictive operations scheduling.

To illustrate, if a different device connected to the industrial automation equipment 16 fails after the variance is detected, the variance including a reason and/or potential effects of the variance may be logged for the particular mode of operation of the industrial automation equipment 16. Then, when the variance is detected in the future, the processor 68 may predict that the device will fail and may send the computing device 26 a notice of the prediction. Further, if a variance is detected and the processor 68 does not take any action and then the industrial automation equipment 16 fails. A technician may service the equipment to determine what caused the failure and can log the reason for the variance into the multi-purpose sensing device 52 using the computing device 26, thereby enabling the processor 68 to diagnose what the cause of the variance is in the future if detected again.

It should be noted that the methods 80, 100, and 110 are performed using the processor 68 that is part of the multi-purpose sensing device 52 and the method 90 is performed by the processor 36 of the computing device 26. The multi-purpose sensing device 52 and the computing device 26 are configured to execute instructions that enable each device to interact with the industrial automation equipment 16. As such, the multi-purpose sensing device 52 and the computing device 26 are tied to particular machines to assist in the management and operations of the industrial automation equipment 16, and thus, the industrial application 24. Moreover, it should be noted that the data received by the multi-purpose sensing device 52, the computing device 26, the cloud-based computing system 28, the industrial automation equipment 16, or the control/monitoring device 14 may be transformed when being transmitted, analyzed, or depicted for view by a user of the respective device. For example, the alert generated based on signals received from the sensors 58, 60, 62, 64, and 66 includes a transformation of the sensor data signals to the alert. Also, the directions generated based on the location data from the multi-purpose sensing device 52 include a transformation of the location data signals to navigational directions. Further, the command signal generated based on data signals received from the sensors 58, 60, 62, 64, and 66 enables controlling the industrial automation equipment 16.

Technical effects of the embodiments described herein include using a multi-purpose sensing device 52 that may include a number of various sensors 58, 60, 62, 64, and 66, a beacon patch 76, and a location beacon or tag 78 to more efficiently operate the industrial automation equipment 16. The sensors 58, 60, 62, 64, and 66 may be used to determine ranges of expected measurements for each respective sensor and determine when measurements are outside of the range. In some embodiments, the processor 68 may perform preventative actions, such as control the industrial automation equipment 16 or send an alert to the computing device 26, when the measurements are outside the range. Also, the location data obtained by the beacon patch 76 and the location beacon or tag 78 may enable the computing device 26 to determine directions to the multi-purpose sensing device 52 and/or the industrial automation equipment 16 to which the multi-purpose sensing device 52 is attached.

In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

The invention claimed is:

1. A multi-purpose sensor configured to couple to a machine operating in an industrial environment, comprising:
   a housing;
   a plurality of sensors disposed within the housing of the multi-purpose sensor and configured to acquire a plurality of different types of datasets associated with the machine; and
   a processor disposed within the housing of the multi-purpose sensor and configured to communicatively couple to the plurality of sensors, wherein the processor is configured to:
      determine a collective measurement signature based on the plurality of different types of datasets acquired over a period of time;
      compare the collective measurement signature to one or more stored measurement signatures associated with unexpected behavior associated with one or more other machines of a same type of the machine;
      determine that the collective measurement signature is indicative of the unexpected behavior based on a comparison between the collective measurement signature and the one or more stored measurement signatures;
      generate one or more signals configured to cause a computing device to perform an action in response to determining that the collective measurement signature is indicative of the unexpected behavior; and
      transmit the one or more signals to the computing device.

2. The multi-purpose sensor of claim 1, wherein the processor is configured to log the collective measurement signature in response to determining that the collective measurement signature is indicative of the unexpected behavior.

3. The multi-purpose sensor of claim 1, wherein the action comprises a preventive action, a diagnostic action, a predictive operation, or a combination thereof.

4. The multi-purpose sensor of claim 1, wherein the one or more signals comprises a command signal configured to adjust an operation of the machine.

5. The multi-purpose sensor of claim 1, wherein the plurality of different types of datasets associated with the machine comprises respective datasets associated with the machine, an environment surrounding the machine, or both.

6. The multi-purpose sensor of claim 1, wherein the one or more stored measurement signatures associated with the unexpected behavior comprise one or more historical measurement signatures associated with the one or more other machine, an environment surrounding the one or more other machines, or both.

7. The multi-purpose sensor of claim 1, wherein the one or more stored measurement signatures correspond to a respective mode of operation associated with the same type of the machine.

8. A method, comprising:
   receiving, via a processor disposed within a multi-purpose sensor associated with a machine operating in an industrial environment, a plurality of different types of sets of data acquired from a plurality of sensors disposed within the multi-purpose sensor over a period of time, wherein the plurality of different types of sets of data are associated with the machine, an environment surrounding the machine, or both;
   determining, via the processor, a collective measurement signature for the plurality of sensors based on the plurality of different types of sets of data;
   determining, via the processor, whether the collective measurement signature varies from a baseline collective measurement signature more than a threshold, wherein the baseline collective measurement signature is determined based on a plurality of historical sets of data associated with one or more other machines of a same type of the machine;
   comparing, via the processor, a variance between the collective measurement signature and the baseline collective measurement signature to one or more stored variances associated with unexpected behavior associated with the one or more other machines;
   generating, via the processor, one or more signals in response to a comparison between the variance and the one or more stored variances, wherein the one or more signals are configured to cause a computing device in the industrial environment to perform an action associated with the machine; and
   transmitting, via the processor, the one or more signals to the computing device.

9. The method of claim 8, wherein determining whether the collective measurement signature varies from the baseline collective measurement signature more than the threshold comprises:
   comparing each set of data of the plurality of different types of sets of data to respective historical sets of data associated with the baseline collective measurement signature; and
   determining that more than a threshold number of sets of data varies from the historical sets of data.

10. The method of claim 8, wherein determining whether the collective measurement signature varies from the baseline collective measurement signature more than the threshold comprises:
    comparing each set of data of the plurality of different types of sets of data to respective historical sets of data associated with the baseline collective measurement signature; and
    determining at least one set of data of the plurality of different types of sets of data varies from the respective historical sets of data by a threshold amount.

11. The method of claim 8, wherein the action comprises an alert configured to cause the computing device to display a visual representation of the alert, disable functionality of a software application running on the computing device, or both.

12. The method of claim 8, wherein the plurality of different types of sets of data comprises motion data indicating movement of an object relative to the machine, and the one or more signals are configured to adjust one or more operations of the machine to be unavailable in response to an object being within a distance relative to the machine.

13. The method of claim 8, wherein the plurality of different types of sets of data comprises motion data indicating movement of an object relative to the machine, and the one or more signals are configured to adjust one or more operations of the machine to be available in response to an object being within a distance relative to the machine.

14. The method of claim 8, wherein the one or more signals are configured to cause the computing device to perform the action based on an extent of the variance between the collective measurement signature and the baseline collective measurement signature.

15. A non-transitory, computer-readable medium comprising computer-executable instructions, that, when executed, are configured to cause the processor to:
    receive, from a plurality of sensors disposed within a multi-purpose sensor, a plurality of sensor measurements associated with a machine, an environment of the machine, or both, over a period of time for each sensor of the plurality of sensors;
    determine a collective measurement signature for the multi-purpose sensor based on the plurality of sensors measurements;
    compare the collective measurement signature to one or more stored measurement signatures associated unexpected behavior associated with one or more other machines of a same type of the machine;
    determine that the collective measurement signature is indicative of suspected unexpected behavior based on a comparison between the collective measurement signature and the one or more stored measurement signatures;
    generate one or more signals configured to cause a computing device to perform an action in response to determining that the collective measurement signature is indicative of the suspected unexpected behavior; and
    transmit the one or more signals to the computing device.

16. The non-transitory, computer-readable medium of claim 15, wherein the processor is configured to log the collective measurement signature in response to determining that the collective measurement signature is indicative of the suspected unexpected behavior.

17. The non-transitory, computer-readable medium of claim 15, wherein the processor is configured to adjust a set of possible actions to be performed by the computing device based on the logged collective measurement signature, wherein the set of possible actions comprises the action.

18. The non-transitory, computer-readable medium of claim 17, wherein adjusting the set of possible actions comprises removing the action from the set of possible actions based on the logged collective measurement signature.

19. The non-transitory, computer-readable medium of claim 17, wherein adjusting the set of possible operations comprises adding an additional action to the set of possible actions based on the logged collective measurement signature.

20. The non-transitory, computer-readable medium of claim 15, wherein the one or more stored measurement signatures correspond to a respective mode of operation associated with the same type of the machine.

* * * * *